(12) United States Patent
von Osterhausen (10) Patent No.: US 11,377,176 B2
(45) Date of Patent: Jul. 5, 2022

(54) FIBER REINFORCED STRUCTURAL COMPONENT AND METHOD FOR PRODUCING SAME

(71) Applicant: Thilo von Osterhausen, Saarbrücken (DE)

(72) Inventor: Thilo von Osterhausen, Saarbrücken (DE)

(*) Notice: Subject to any disclaimer, the term of this patent is extended or adjusted under 35 U.S.C. 154(b) by 80 days.

(21) Appl. No.: 16/319,770

(22) PCT Filed: Jul. 21, 2017

(86) PCT No.: PCT/EP2017/000892
§ 371 (c)(1),
(2) Date: Jan. 22, 2019

(87) PCT Pub. No.: WO2018/015021
PCT Pub. Date: Jan. 25, 2018

(65) Prior Publication Data
US 2020/0255101 A1    Aug. 13, 2020

(30) Foreign Application Priority Data

Jul. 22, 2016 (CH) .................................... 952/2016

(51) Int. Cl.
| | | |
|---|---|---|
| *B63B 32/57* | (2020.01) | |
| *B63B 32/50* | (2020.01) | |
| *B29L 31/52* | (2006.01) | |
| *B63B 32/80* | (2020.01) | |
| *B32B 38/06* | (2006.01) | |

(52) U.S. Cl.
CPC .............. *B63B 32/57* (2020.02); *B63B 32/50* (2020.02); *B29L 2031/5272* (2013.01); *B32B 38/06* (2013.01); *B32B 2305/022* (2013.01); *B62B 2501/065* (2013.01); *B63B 32/80* (2020.02); *B63B 2231/50* (2013.01)

(58) Field of Classification Search
CPC ......... B63B 32/57; B63B 32/50; B63B 32/80; B63B 2231/50; B29L 2031/5272; B32B 38/06; B32B 2305/022; B32B 37/185; B62B 2501/065
USPC .......................................... 428/172; 156/245
See application file for complete search history.

(56) References Cited

U.S. PATENT DOCUMENTS

| | | | |
|---|---|---|---|
| 8,535,794 B2 * | 9/2013 | Brauers .................. | B32B 5/245 428/306.6 |
| 2003/0224675 A1 | 12/2003 | Yeh | |

FOREIGN PATENT DOCUMENTS

| | | |
|---|---|---|
| FR | 2841146 | 12/2003 |
| JP | 2003306195 | 10/2003 |
| WO | WO2005012074 | 2/2005 |
| WO | WO2018015021 | 1/2018 |

* cited by examiner

*Primary Examiner* — Anthony D Wiest
(74) *Attorney, Agent, or Firm* — Morriss O'Bryant Compagni Cannon, PLLC (57) ABSTRACT

The invention relates to a fiber reinforced structural component, which may be used in a surfboard for stand-up paddling, wave riding, wind surfing and the like, comprising a body made of plastic, wherein the body is delimited by a surface, to which a laminate layer made of a fiber mat and a matrix is undetachably connected. The surface has at least one circumferential groove-shaped recess, by means of which a predetermined partial area of the surface is delimited.

19 Claims, 5 Drawing Sheets

FIBER REINFORCED STRUCTURAL COMPONENT AND METHOD FOR PRODUCING SAME

CROSS-REFERENCE TO RELATED APPLICATIONS

This application is a national phase entry under 35 U.S.C. § 371 of PCT/EP2017/000892 filed Jul. 21, 2017, which claims priority to Swiss Patent Application No. 00952/16 filed Jul. 22, 2016, the entirety of each of which is incorporated by this reference

FIELD OF THE INVENTION

The present invention relates to a device, in particular surfboard for stand-up paddling, wave riding, wind surfing and the like, with a body made of plastic and a laminate layer, a method for manufacture the same as well as the use of the device as a surfboard for stand-up paddling, wave riding, wind surfing and the like.

BACKGROUND OF THE INVENTION

The present invention relates to a device, in particular a surfboard for stand-up paddling, wave riding, wind surfing and the like, a method for manufacturing a relevant device as well as a use of a relevant device.

Devices are known from prior art, in particular surfboards for wave riding, stand-up paddling, so-called SUPs, and also wind surfing, which consist of a body made of foamed plastic, which is initially brought into its subsequent shape by means of mechanical machining from a block and is then covered with a fiber woven fabric impregnated with a matrix. In this case, before application of the impregnated fiber woven fabric, the surface of the body can be additionally impregnated with the matrix so that sufficient matrix is available so that the fiber woven fabric is wetted with the matrix over the entire area after curing. Usually the matrix consists of polyester resins, epoxy resins or also polyurethane resins. Usually the resins in the cured state behave similarly to glass and are therefore hard and brittle. By embedding a fiber woven fabric such as, for example, glass fiber fabric in which the glass threads have a predetermined alignment in one plane or glass fiber mats in which the glass threads have no predetermined alignment in one plane, in the matrix, a high breaking elongation and an elastic energy absorption is achieved. The higher the glass fiber fraction in a laminate, the better are these properties. The bodies are usually made of extruded polystyrene (XPS) or expanded polystyrene (EPS) or also polyurethane foam which are very light but cannot absorb high bending loads.

During operation, a surfboard is exposed to high, partially abrupt loads which can result in a bending of the surfboard in all directions, in particular transversely to its longitudinal axis extending in the longitudinal direction of the surfboard, by up to about 30 cm. It has been shown that surfboards of the known type in some cases cannot withstand these loads and a separation of the laminate from the body can occur. In order to produce an increased bending stiffness of the surfboard, in the past a corresponding number of laminates/laminate layers have been placed one above the other. Hereby however, on the one hand the weight of the surfboard is increased and on the other hand the elasticity of the surfboard is restricted which however is absolutely desired in predetermined areas, in particular at its ends, namely at the nose and at the tail.

SUMMARY OF THE INVENTION

It can be a need to prevent any separation of a laminate layer from a body made of foamed plastic and to be able to adapt the bending line to the loads which actually occur.

This need can be satisfied by a subject matter of the independent claims. Advantageous embodiments are obtained from the subject matters of the dependent claims.

According to a first exemplary embodiment of the invention, a device, in particular a surfboard for stand-up paddling, wave riding, wind surfing and the like, comprising a body made of plastic is proposed, wherein the body is delimited by a surface, to which a laminate layer made of at least one fiber mat and a matrix is undetachably connected. The surface comprises at least one circumferential groove-shaped recess at least in one subregion, due to which a predetermined partial area of the surface is delimited.

Particularly suitable are plastics which have a low specific weight. In order to additionally reduce the weight, the plastics can be foamed. The foaming of the plastic may be done chemically or physically. Specifically the embedding of gas such as, for example, air, nitrogen or even carbon dioxide in the plastic can reduce the weight. The plastics can be expanded or extruded plastics such as, for example, polystyrene or polyurethane. The plastics can be obtained completely or partially from oil and/or renewable raw materials. The body can be manufactured from one layer of plastic or also from several layers of plastic which can be joined together by gluing or welding. As a result of a skillful arrangement of individual layers, the body can be configured so that it encloses one or more chambers which are filled with gas, preferably with air. By this means the weight of the body can be further reduced compared to a body which has no gas-filled chambers. Also by a skillful choice of the individual layers from different plastics, the bending and torsional stiffness of the device can be influenced. Also each individual layer can be fabricated homogeneously, i.e. from one plastic material or heterogeneously, i.e. from different plastic materials. For example, fibers or rods of unfoamed plastic can be embedded in a layer of possibly foamed plastic to change its strength, wherein this plastic can be the same as the foamed plastic or different from the foamed plastic. Furthermore, a layer can also be inhomogeneous per se, i.e. the plastic at different locations can have a different specific density. Fibers of a fiber mat can consist of glass, glass filaments, fiberglass, carbon, aramid, dyneema, polyethylene, basalt, texalium, parabean or of regenerative raw materials such as hemp, flax, bamboo, jute or sisal or a mixture thereof. The fiber mat can be a woven fabric, an interlaid scrim, a nonwoven or can also be made of rovings. The interlaid scrim can be monoaxial, also called unidirectional, biaxial or multiaxial. The nonwoven is readily flexible in each direction and can thus be particularly suitable to extend along the surface of the body, in particular into the recesses, and therefore not protrude from the surface at the transition from the recess to the partial area of the surface. A nonwoven of glass fibers having a weight of approximately 120 g/m$^2$ has proved successful, wherein other nonwovens having a weight between 20 g/m$^2$ and 200 g/m$^2$ can certainly also be used. Fiber mats of glass fibers will usually have a weight of approximately 50 g/m$^2$ and 480 g/m$^2$. Fiber mats of aramid fibers having a weight of approximately 60 g/m$^2$ and 400 g/m$^2$ can be readily processed. The circumferential groove-shaped recess can be configured, for example as a V-groove, rectangular groove or as a fillet. The side walls of the recess and the partial areas will usually enclose an angle greater than 90° in order to facilitate a removal of the punch or a stamper with which the recess can be formed in the body. The partial area can be flat, singly curved or doubly curved or consist of a mixture thereof. The matrix can be unsaturated polyester resin, epoxy resin, vinyl ester resin or polyurethane resin. The said resins can be mixed with fillers such as, for example, hollow glass spheres, glass fiber scraps, wood flour, talc, ground carbon fibers or hempfibers, chalk, quartz flour, cotton flakes or silicas or a mixture thereof. By adding the fillers, the properties of the resins can be changed for improved processing properties or improved adhesion properties. Also by adding fillers, the damping properties can also be changed. Furthermore, colorants can also be added to the resins. The body can be configured to be board-like. However, the body can also have any three-dimensional shape. In this case, the body can also have structures on its upper side. These structures can be microscopic and/or macroscopic. In general, the body serves to distance the matrix or the laminate from the neutral axis of the device. The bending and torsional strength as well as the flex of the device, or the board, can be adjusted in wide ranges via the distance of the laminate from the neutral axis and the selected structure of the body. Furthermore, the plastics used for the body can be selected in such a manner than the surface thereof is suitable for further processing to form a device made of composite material, i.e. the surface of the body can be joined to the matrix optionally using an adhesion promoter.

Due to the circumferential groove-shaped recess, the surface can be enlarged so that the laminate layer can rest on an enlarged area compared with a surface without recesses. The enlarged surface enlarged by the circumferential groove-shaped recess allows more adhesion forces to act which can thus result in an improved joining of the laminate layer to the foamed plastic of the body. Furthermore, the matrix can be adjusted by means of suitable measures in such a manner than it can penetrate into the body and thus form a positive connection between the laminate layer and the body after curing, which can improve the connection of the laminate layer to the body. In addition, the surface of the body can also be increased by an increased roughness. The increased roughness can primarily result in an increase in the adhesion forces which prevent a separation of the laminate layer from the surface of the body. In addition to the adhesion forces, a mechanical wedging of the cured matrix in the pores forming the roughness can also occur. The circumferential groove-shaped recess can delimit a partial area of the surface with an arbitrary contour. As a result of the circumferential groove-shaped recess, not only the surface can be increased to increase the adhesion forces of the laminate layer to the body but also the bending stiffnesses around and transverse to the longitudinal axis extending in the longitudinal extension of the device. A transverse axis and a vertical axis can extend transversely to the longitudinal axis. In this case, all the axes each enclose a right angle to one another. Thus, due to constant or varied depth of the circumferential groove-shaped recess and due to the area content of the partial area inscribed by the circumferential groove-shaped recess, the stiffnesses against rolling, pitching and yawing can be adapted to the actually occurring loads at least in wide ranges if not even completely. Due to the circumferential groove-shaped recesses combined with the fiber mat, in particular a fiber mat made of nonwoven, the surface can be capable of absorbing more pressure without forming pressure points on the surface which not only form an unattractive appearance but also can already form a microseparation of the laminate layer from the body. This can be explained by the fact that the laminate layer per se does not have the form of a sheet as is the case in surfboards according to the prior art but the proportion of the laminate layer extending along the groove-shaped recesses act as reinforcing ribs. Accordingly, a pressure acting substantially perpendicularly on the laminate layer can be absorbed by the reinforcing ribs. Accordingly only a small proportion of the pressure acting on the laminate layer is transferred to the body. The nonwoven can additionally have the effect that the pressure acting on the laminate layer is already distributed extensively inside the laminate layer before it is introduced into the reinforcing ribs. As a result, a higher operating lifetime can be achieved. Also as a result of the proposed device, the bending properties can be maintained the same over a long time period. In addition, an additional reinforcement, for example, made of a carbon strip impregnated with a matrix, can be inserted underneath the first laminate layer, in particular in conjunction with a surfboard in a linear groove-shaped recess arranged on the surface which can extend substantially rectilinearly along a central line extending in the direction of the longitudinal extension. In such an arrangement, the laminate layer which extends as a first layer at least partially along the circumferential groove-shaped recess is then designated as first laminate layer. In order to further increase the bending stiffness, additional laminate layers can be applied to the first laminate layer. These additional laminate layers can either extend along the surface of the lowest laminate layer, i.e. form the partial areas and the recesses on their respective upper sides, or the additional laminate layers can be flat on the upper sides thereof, i.e. only extend along the partial areas and level the circumferential groove-shaped recesses. A levelling can take place, for example, by filling with the matrix, possibly by adding fillers. It is understood that the circumferential groove-shaped recesses can be formed on the upper sides, undersides and/or narrow sides thereof in the case of devices formed in a board-like manner. The circumferential groove-shaped recesses can also be combined with non-circumferential groove-shaped recesses. For example, in the case of a device in the form of a surfboard, a substantially rectilinear recess can extend substantially from nose to tail, which recess is filled with a laminate layer containing carbon fibers for example.

According to a further exemplary embodiment of the invention, the first partial area having the first circumferential groove-shaped recess is adjoined by a second partial area having a second circumferential groove-shaped recess.

As a result of an increase in the number of partial areas delimited by circumferential groove-shaped recesses, which can appropriately adjoin one another and can possibly vary from one another in their area content, the stiffness against bending about the longitudinal axis, the transverse axis and the vertical axis can be produced in a differentiated manner. In addition, due to the additional circumferential groove-shaped recesses, the surface and therefore the contact area of the laminate layer can be increased. This can additionally result in an improved connection between the body and the laminate layer.

According to a further exemplary embodiment of the invention, a predetermined subsection of the first circumferential groove-shaped recess of the first partial area forms a predetermined subsection of the second circumferential groove-shaped recess of the second partial area adjoining the first partial area.

Thus adjacent partial areas share otherwise adjacently extending subsections of the recesses. This can reduce the requirement for matrix and fiber mat compared with a device in which the groove-shaped recesses of each partial area are configured to be individually circumferential without using subsections of the groove-shaped recesses of the neighboring partial area. This can lead to a saving of weight and a saving of material without the stiffness against bending around the longitudinal axis, the transverse axis and the vertical axis being significantly reduced hereby.

According to a further exemplary embodiment of the invention, the subregion of the surface of the body comprises a plurality of partial areas delimited by circumferential groove-shaped recesses which adjoin one another and in which respectively predetermined subsections of the circumferential groove-shaped recess of a partial area are formed by predetermined subsections of the circumferential groove-shaped recess of a neighboring partial area.

Thus, by means of a predetermined arrangement of the groove-shaped recesses in the subregion of the surface, a network of adjacent partial areas can be produced without groove-shaped recesses extending adjacent to one another mutually contacting one another.

According to a further exemplary embodiment of the invention, the circumferential groove-shaped recess is formed by a sequence of distance sections or curve sections or a mixture of distance sections and curve sections.

From a sequence of distance sections and curve sections, when viewed onto the surface of the body, it is possible to produce any arbitrary two-dimensional geometrical figure which can be formed by the circumferential groove-shaped recess in the body.

According to a further exemplary embodiment of the invention, the circumferential groove-shaped recess has a contour of a hexagon which comprises at least four first sides of substantially the same length each opposite one another in pairs and two mutually opposite second sides of substantially the same length.

In this case, two mutually opposite second sides which are substantially the same length can be longer or shorter than the remaining four first sides. The angle enclosed between two adjacent sides can be substantially 60°. This special hexagonal shape can provide an almost perfect use of space since intermediate spaces between the individual hexagons are not present. Of all the shapes which can be arranged against one another without gaps, hexagons have the best ratio of stiffening or recess to frequency in relation to the required stiffness. Thus, hexagons arranged against one another can require the least laminate layer compared with all the other geometrical shapes to achieve a predefined stiffness. The hexagons can also be aligned in such a manner that the variable side pair extends in the direction of the longitudinal axis. The length of this side pair compared with the other two side pairs can also increase in the direction of the nose or tail in order to allow a greater deflection of the bending line in the case of constant application of force and substantially constant depth of the circumferential groove-shaped recesses. Naturally the variable side pair can extend transversely to the longitudinal axis or at any angle to this. For structural components the reverse route can also be taken and the two side pairs at the ends can have the shortest length in order to increase successively in the direction of the centre of the structural component.

According to a further exemplary embodiment of the invention, the circumferential groove-shaped recess is configured as a regular hexagon.

This embodiment in which all the side are substantially the same length is also designated as honeycomb. The circumferential groove-shaped recesses extend substantially in the direction of the vertical axis into the body. Although the regular hexagonal shape is not rotationally symmetrical, in practice it is nevertheless calculated as if the strength is the same in all directions. A honeycomb-shaped structure due to the circumferential groove-shaped recesses in the body can lead to a high mechanical stiffness with low weight. In order to influence the bending line about an axis or all three axes, for example the depth of the circumferential groove-shaped recesses can be varied with the same area content of all the partial areas.

According to a further exemplary embodiment of the invention, each partial area has an area content, wherein the area contents are at least partially of different size.

Usually the area content will increase continuously in the direction of the ends along the longitudinal axis in order to allow a defined sagging at a predetermined force. In the direction of the transverse axis, the area contents can be the same or also vary in order to produce a defined bending line under a predetermined application of force.

According to a further exemplary embodiment of the invention, a depth which the circumferential groove-shaped recess penetrates into the body measured from the surface of the adjacent partial area, is approximately 0.5 mm to approximately 15 mm, preferably approximately 2 mm to approximately 10 mm and particularly preferably approximately 3 mm to approximately 5 mm.

The smaller the depth of the circumferential groove-shaped recess, the lower can be the stiffness against bending.

According to a further exemplary embodiment of the invention, the depth of a circumferential groove-shaped recess is constant.

In conjunction with groove-shaped recesses of constant depth, the area contents of the partial areas can be constant or variable. A particularly simple calculation of the stiffness is obtained for regular hexagons arranged against one another without gaps having groove-shaped recesses which are all the same depth.

According to a further exemplary embodiment of the invention, the depth of a circumferential groove-shaped recess varies.

If only one circumferential groove-shaped recess is located in the partial area of the surface, the stiffness against bending can be varied by means of a variation of the depth of the circumferential groove-shaped recess with the same area content of the partial area.

According to a further exemplary embodiment of the invention, the depth of the circumferential groove-shaped recess of two adjacent partial areas is different.

In this case, the depth inside the circumferential groove-shaped recess can vary in such a manner that in conjunction with neighboring circumferential groove-shaped recesses, a continuous decrease or increase in the depth of the individual circumferential groove-shaped recesses, for example, in the direction of the ends of the surfboard can be formed. Hereby the stiffness against bending, also called flex, can be influenced. The variation of the depth can also take place in steps. It is understood that by varying the area content of the partial areas and/or varying the depth of the circumferential groove-shaped recesses, the stiffness against bending about the longitudinal axis, the transverse axis and/or the vertical axis can be influenced.

According to a further exemplary embodiment of the invention, the fiber mat lies fully against the circumferential groove-shaped recess and that foamed plastic has passed at least partially through the fiber mat.

The passage of the plastic from which the body is made through the fiber mat results in a firm connection of the fiber mat to the recess or to the wall delimiting the circumferential groove-shaped recess. This can be produced, for example, by heating a punch or a stamper which has an elevation corresponding to the circumferential groove-shaped recess and pressing this with a predetermined force onto the body covered by the fiber mat which has no circumferential groove-shaped recess. The temperature is set such that the plastic of the body melts under the stamper, passes through the fiber mat and cools after removal of the punch or the stamper. In this case, the plastic which has passed through the fiber mat solidifies. Not only nonwoven which is very flexible in all directions but also woven fabric or underlaid scrim which are relatively rigid compared to nonwoven can be processed by this procedure. It is understood that in order to achieve a predetermined temperature on the surface of the body, the punch can be pressed for a predetermined time onto the fiber material and thus onto the surface of the body with a predetermined pressure depending on the thermal conductivity of the fiber material and its thickness.

According to a further exemplary embodiment of the invention, the body comprises a core and an intermediate layer having a predefinable thickness extending between the core and the surface, wherein the intermediate layer is filled with the matrix.

Specifically as a result of this intermediate layer with the matrix, an interface stress between laminate layer and surface which occurs when load is applied to devices fabricated according to the prior art no longer occurs. On the contrary, due to this intermediate layer a stress produced by the action of force is successively reduced. Thus, for a predefined action of force, the stresses which occur can be reduced by a corresponding thickness of the intermediate layer and its elasticity to such an extent that these cannot damage the core. This configuration additionally effectively prevents any separation of the laminate layer from the body. The intermediate layer is substantially determined by the penetration depth of the matrix and its elasticity in the cured state. In order to influence the penetration depth, the consistency of the liquid matrix can be influenced. For example, a particularly thin-film matrix can be used or the consistency of the liquid matrix can be reduced by heating. When using, for example, epoxy resin as matrix, the elasticity of the cured matrix can be additionally increased by means of a reduced addition of curing agent. Usually the concentration of the matrix in the intermediate layer is reduced to a certain extent. The thickness of the intermediate layer can be increased by selecting an open-pore foam compared with a closed-pore foam.

According to a further exemplary embodiment of the invention, a second laminate layer comprising a fiber mat and a matrix is laminated onto an upper side of the laminate layer extending on the surface of the body, wherein an underside of the second laminate layer extends along the upper side of the laminate layer.

As a result of the extension of the underside of the second laminate layer along the upper side of the first laminate layer which is firmly connected to the surface of the body, the contour of the recesses is substantially mapped on an upper side of the second laminate layer opposite the upper side of the first laminate layer. Thus, the upper side of the second laminate layer has circumferential groove-shaped recesses. The second laminate layer can differ from the first laminate layer in relation to the fiber mat and/or the matrix. For example, the fiber mat of the first laminate layer can be a nonwoven and the fiber mat of the second laminate layer can be a glass fiber woven fabric. The second laminate layer can reinforce the construct of body and first laminate layer in all three axes. It is not necessary for the first and the second laminate layer to completely surround the surface of the body. It can be possible that the surface of the body is covered by the first laminate layer only in one or several subregions and the second laminate layer only covers the remaining subregions of the surface. The second laminate layer can also enclose the entire body and thus also the subregion covered by the first laminate layer. It is understood that the second laminate layer can be applied to the first laminate layer in the so-called wet-in-wet method. In this method the matrix of the first laminate layer is not yet cured before the matrix of the second laminate layer is applied. Alternatively the second laminate layer can be applied to the first laminate layer after a tear-off fabric has been removed from the first laminate layer, under which the matrix of the first laminate layer is cured.

According to a further exemplary embodiment of the invention, a second laminate layer comprising a fiber mat and a matrix is laminated onto an upper side of the laminate layer extending on the surface of the body, wherein an underside of the second laminate layer extends exclusively along the upper side of the laminate layer of the partial areas so that the upper side of the second laminate layer is flat.

The underside of the second laminate layer merely extends along a subsection of the upper side of the first laminate layer which is firmly connected to the partial area of the surface. The second laminate layer can bridge the circumferential groove-shaped recess which has formed on the upper side of the first laminate layer whereby the circumferential groove-shaped recess mapped on the surface of the first laminate layer is filled flush with the partial area by means of a matrix to which a filler has possibly been added. Thus, the upper side of the second laminate layer can be substantially flat. Usually there are no air bubbles in the first laminate layer, the second laminate layer and in the matrix which levels the circumferential groove-shaped recess. It is understood that further laminate layers can also be applied to the second laminate layer. Also fiber mats such as for example of carbon basalt or dyneema can be introduced as reinforcements between the laminate layers on predetermined subregions depending on the desired size and shape.

According to a further exemplary embodiment of the invention, a method for producing a structural component with a reinforcement made of a fiber-plastic composite, in particular a surfboard for stand-up paddling, wave riding, wind surfing and the like, is proposed comprising a body made of plastic, wherein the body is delimited by a surface to which a laminate layer comprising a fiber mat and a matrix is undetachably connected. The method comprises the following process steps: applying the fiber mat to the body delimited by the surface and then forming at least one circumferential groove-shaped recess at least in a subregion of the surface, wherein a predetermined partial area of the surface is delimited by the circumferential groove-shaped recess.

Thus, the fabrication of the at least one recess can be accomplished through the fiber mat. Usually the recess is produced on the surface by application of a predetermined force by means of a punch which has an elevation corresponding to the at least one recess.

According to a further exemplary embodiment of the invention, a punch is heated to a predetermined temperature, wherein the punch has at least one elevation corresponding to the circumferential groove-shaped recess.

As a result of the heating of the punch, the expenditure of force to produce the recess is reduced. The punch can be heated to a temperature which can result in melting of the foamed plastic. Thus, the temperature can be dependent on the selected plastic. The penetration depth of the punch into the body can also be regulated by applying a predetermined force to the punch. Thus, under constant force the punch can penetrate more deeply at higher temperature than at lower temperature. The molten plastic can penetrate through the fiber mat and thus bring about an adhesion of the fiber mat to the recess or to the wall of the recess. In this case, after impregnation of the fiber mat with the matrix, a particularly close bond can be produced between body and first laminate layer. The punch can be heated, for example, by means of induction or by an external heat source. Induction can be appropriate if the punch is made of a ferromagnetic material. Electrical heating cartridges such as those used in injection moulding technology for heating injection moulds for plastics processing can also be used for heating the punch. The punch can additionally have a temperature sensor by means of which the temperature of the punch can be monitored. This temperature sensor can be coupled to a temperature regulating device by means of which the temperature is regulated so that the punch reaches a predetermined temperature.

According to a further exemplary embodiment of the invention, the surface of the body is heated above the melting point of the plastic and then the punch is pressed into the subregion of the body covered with the fiber mat. The surface of the body can be heated through the fiber mat. This can be accomplished, for example, by exciting the dipoles of some types of plastic (polar plastics) by means of high frequency. An internal friction in the plastics can also be produced by ultrasonic waves which can result in a heating of the surface of the body. Also specifically heated gas, in particular hot air can be used for heating the surface of the body, which gas is guided over the fiber mat. This can bring about an advantage in the cycle time of the production since the forming of the groove-shaped recesses can be decoupled from the melting of the surface of the body. A continuous production can also be possible as a result.

According to a further exemplary embodiment of the invention, the punch has all the elevations corresponding to the circumferential groove-shaped recesses.

Thus, all the partial areas can be produced in one operation. In this case, the punch, also called stamper, can have the size of the subregion of the surface which has the circumferential groove-shaped recesses. If the groove-shaped recesses extend in a network manner over the entire surface of the device, the stamper can have the size and shape of the entire surface or more than one stamper can be used to cover the entire surface.

According to a further exemplary embodiment of the invention, the predetermined temperature of the punch is between approximately 90° C. and approximately 220° C., preferably between approximately 120° C. and approximately 180° C. and particularly preferably between approximately 140° C. and approximately 160° C.

The temperature can be selected depending on the melting point of the foamed plastic from which the body is made. Also the temperature along the stamper can have a temperature profile in order to produce different penetration depths of the stamper in the body under constant application of force. In an expedient manner a temperature profile inside the stamper can be produced by using several heating cartridges. The stamper can be produced, for example, by primary shaping, i.e. by application and melting together of individual layers by using lasers, or also by machining, preferably by milling. Also by using CNC technology, it is possible to produce stampers which can be one- or two-dimensionally curved. Usually the size and the shape of the stamper is selected so that all the desired circumferential groove-shaped recesses can be produced in one operation on one surface of the structural component, i.e. front surface, side surface or rear surface. A typical method of manufacture for producing the structural component can be to encase the body, which can be made of expanded polystyrene, for example with a fiber mat, which for example can be a woven fabric of glass fibers, and apply the stamper whose elevations form a honeycomb shape in the subregion in which the circumferential groove-shaped recesses are to be formed. If the stamper has already been heated to the predetermined temperature by an external heat source, the heated stamper can be pressed with a predetermined force onto the fiber mat which abuts at least substantially against the surface of the body. If the stamper has a lower temperature than the predetermined temperature when pressing onto the fiber mat, the stamper can now be heated to the predetermined temperature, for example, by the heating cartridges. The pressing of the stamper onto the fiber mat can be accomplished, for example, in a hydraulically or pneumatically operated press. Pneumatic or hydraulic cylinders can also act directly on the stamper. When operating with several cylinders distributed over the longitudinal direction of extension of the structural component, the pressing pressure on the individual pressure points on the stamper can be different. The force acting on the stamper can also be applied mechanically, for example, by threaded or toggle lever structures. The stamper can be heated to about 150° C. depending on the plastic used. At this temperature the foamed plastic can melt. The molten plastic can pass through the fiber mat and harden after cooling. In this case, the fiber mat can lie substantially fully against the recess or the wall of the recess. After separation of the fiber mat-body composite from the stamper, the fiber mat can be impregnated with a matrix. This can be accomplished by impregnating the fiber mat with a matrix. According to the prior art the matrix can also be covered with a tear-off fabric, the fiber mat-body composite impregnated with the matrix is introduced into a vacuum bag and cured under negative pressure. By this means the matrix can be pressed into the fiber mat. In addition, matrix can also penetrate into the body. Furthermore, a suction fabric can be placed on the tear-off fabric which can absorb excess resin not absorbed by the body and/or the fiber mat. After removing the tear-off fabric, a second laminate layer comprising for example glass fiber woven fabric and the same matrix can be applied to the laminate layer of fiber mat and matrix, which is likewise pressed onto the first laminate layer in the vacuum bag by negative pressure.

According to a further exemplary embodiment of the invention, the punch is pressed with a predetermined pressure during a predetermined time period via the fiber mat onto the surface of the body. In this case, the punch can be pressed at a predetermined temperature onto a first subregion at a first pressure onto the heated surface of the fiber mat, which lies on the surface of the body at least in a subregion, for a first predetermined time period. Then the punch can be pressed at the same predetermined temperature onto a second subregion at a second pressure onto the heated surface of the fiber mat which lies on the surface of the body at least on a subregion, optionally for a second predetermined time period, wherein the first pressure is different from the second pressure. As a result, the penetration depth of the punch in the body on the first subregion is different from the penetration depth on the second subregion. Depending on the plastics used, an adaptation of the dwell time of the punch in the state inserted into the body can be necessary so that the molten plastic can penetrate sufficiently through the fiber mat.

According to a further exemplary embodiment of the invention, the device is used as a surfboard for stand-up paddling, wave riding, wind surfing and the like. During operation an underside floats on the water and the upper side opposite the underside has a surface which at least in a subregion has at least one circumferential groove-shaped recess which delimits a predetermined partial area of the surface.

Only the upper side of the device or only the underside of the device can have at least one circumferential groove-shaped recess or also the underside and the upper side of the body can each have at least one circumferential groove-shaped recess.

It should be pointed out that features of the device, where appropriate, can also serve as features of the method and vice versa.

Embodiments of the invention are described hereinafter with reference to the appended figures. The figures are merely schematic and not to scale.

DETAILED DESCRIPTION OF EXEMPLARY EMBODIMENTS

At this point it should be assumed that the same parts in the individual figures have the same reference numbers.

Figure 1:
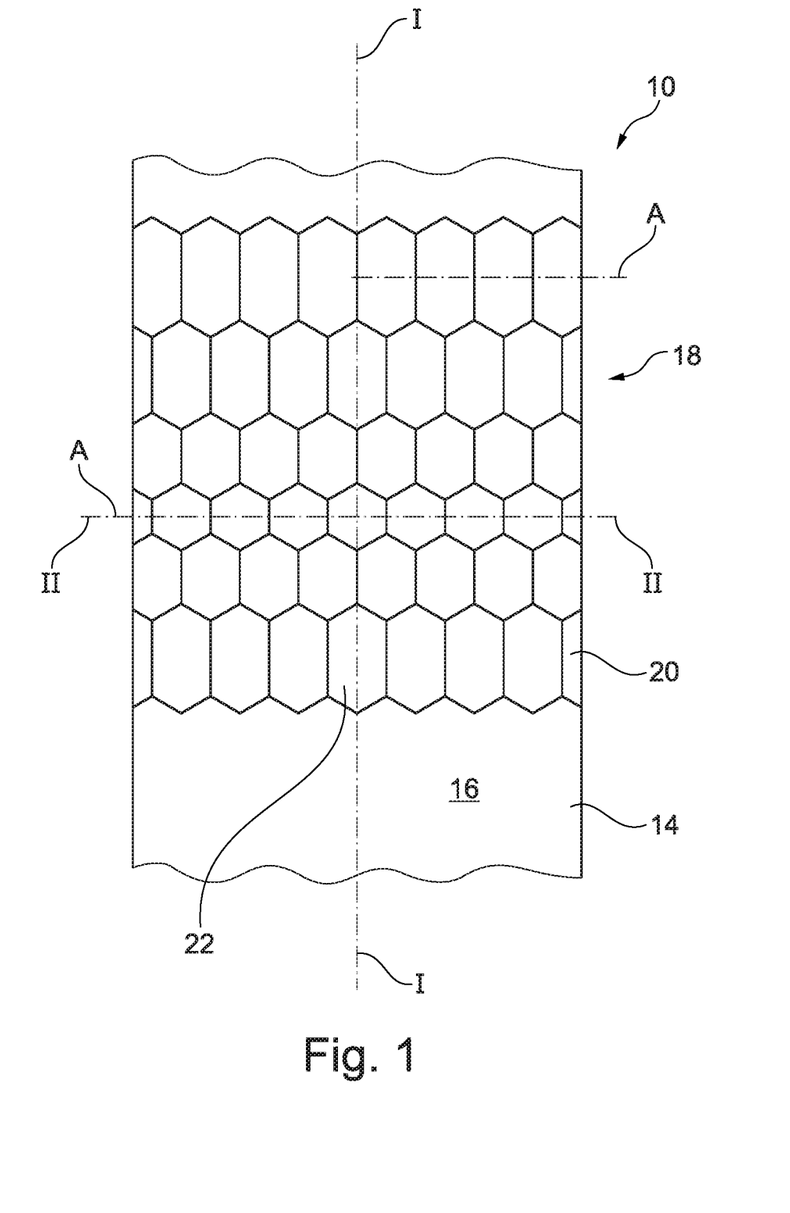
FIG. 1 shows a plan view of a section of a device having hexagonal circumferential groove-shaped recesses in a subregion with a laminate layer.

FIG. 1 shows a plan view of a section of a proposed device 10. The device 10 consists of a board-like body 12 which is made of expanded polystyrene. The body 12 can however also have any other three-dimensional geometrical shape. The body 12 itself can also be produced in sandwich design from several layers of plastics. In this case, the plastics can be homogeneous, inhomogeneous and/or heterogeneous. Chambers which are filled with gas, preferably air, can also be provided in the body. The body 12 is delimited by a surface 14 to which a first laminate layer 16 comprising a fiber mat, specifically nonwoven consisting of glass fibers and a matrix, namely epoxy resin, is undetachably connected. The surface 14 has a subregion 18 in which a plurality of circumferential groove-shaped recesses 20 are formed, covering the subregion 18 of the surface 14 in a network-like manner. The circumferential groove-shaped recesses 20 delimit partial areas 22 with a predetermined area content.

Figure 2:
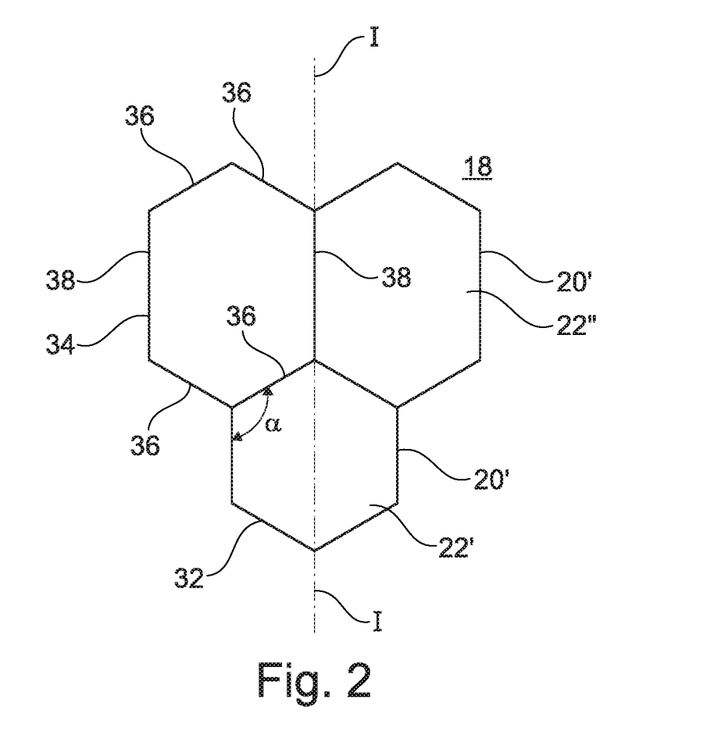
FIG. 2 shows an enlarged section from the subregion of the device shown in FIG. 1 in plan view.

FIG. 2 shows an enlarged section of the subregion 18 of the surface 14 of the device 10 coated with the laminate layer 16. A first groove-shaped recess 20' is formed circumferentially and delimits a first predetermined partial area 22' of the surface 14. The first circumferential groove-shaped recess 20' forms a regular hexagon 30. In this case, all sections 32 from which the hexagon 30 is formed are the same length. Accordingly the angles α enclosed between the adjacent sections 32 are substantially the same, i.e. 60°. The first partial area 22' with the first circumferential groove-shaped recess 20' is adjoined by a second partial area 22" with a second circumferential groove-shaped recess 20". This second circumferential groove-shaped recess 20" is also configured as a hexagon 34. However the hexagon 34 differs from the regular hexagon 30. The hexagon 34 has four sides 36 which are mutually opposite in pairs and which have substantially the same length as the sides of the regular hexagon 30. Two mutually opposite sides 38 of the second circumferential groove-shaped recess 20" extending in the direction of the longitudinal axis I-I are longer than the other sides 36. Accordingly, the first partial area 22' delimited by the first circumferential groove-shaped recess 20' configured as a regular hexagon 30 is smaller than the second partial area 22" delimited by the second circumferential groove-shaped recess 20" configured as hexagon 34.

Figure 3:
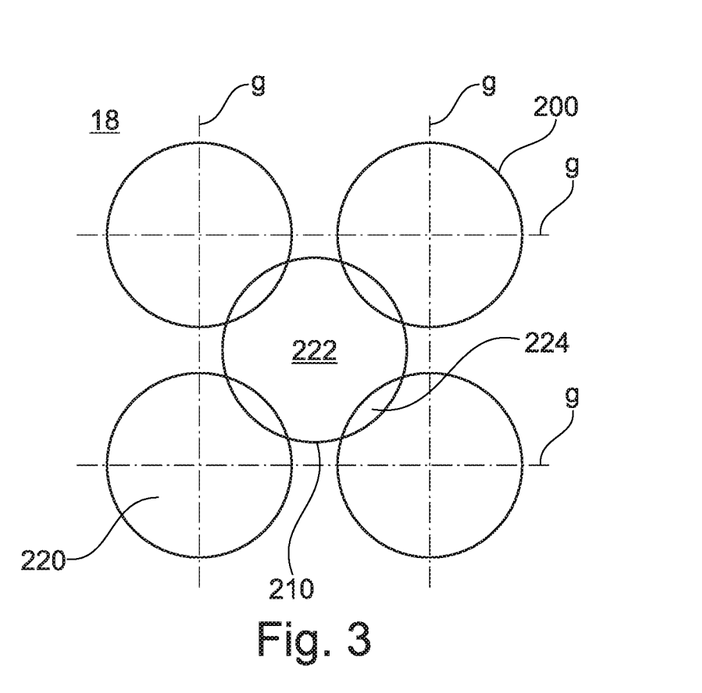
FIG. 3 shows a first alternative embodiment of the circumferential groove-shaped recesses in plan view.

FIG. 3 shows a first alternative embodiment of the circumferential groove-shaped recesses 200, 210 which in plan view form a circular shape, wherein each circle 200, 210 has the same diameter. Five circles 200, 210 are shown, of which four 200 are arranged spaced apart from one another adjacently and below one another. Connecting lines g which connect the centre points of the adjacent circles 200 are either parallel to one another or perpendicular to one another. Each of the four circles 200 is spaced apart from the adjacent circle with the same spacing. The fifth circle 210 is arranged centrally between the four circles 200 and extends into each of the four circles 200. This arrangement results in nine partial areas 220, 222, 224 with substantially three different area contents. Each of the four circles 200 includes a first partial area 220. Furthermore there are four second partial areas 224 which are delimited by the fifth circle 210 from a total area of each of the four circles 200. The fifth circle includes a third partial area 222.

Figure 4:
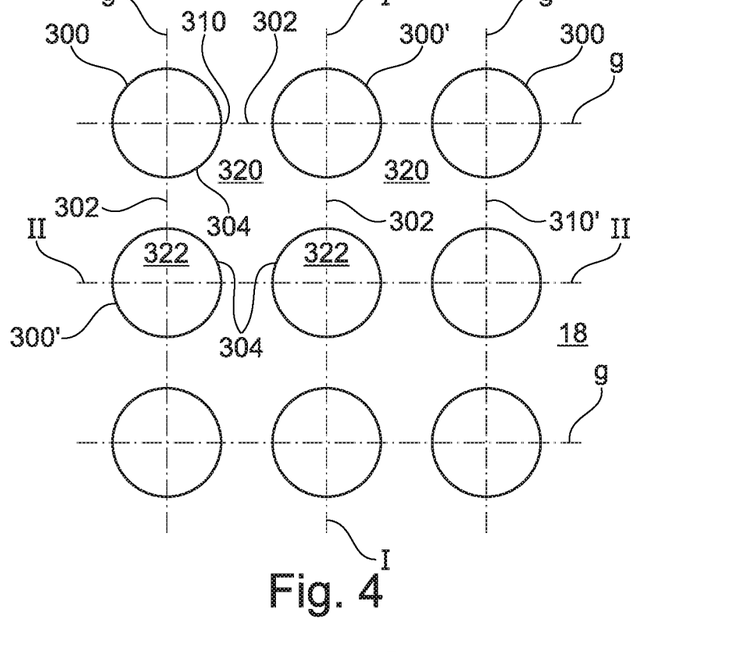
FIG. 4 shows a second alternative embodiment of the circumferential groove-shaped recesses in pan view.

FIG. 4 shows a second alternative embodiment of the circumferential groove-shaped recesses 300, 300', 310, 310' in plan view. Nine circumferential groove-shaped recesses 300, 300' are circles having the same diameter. These circles 300, 300' are shown in a 3×3 arrangement, i.e. in the present exemplary embodiment, three lines arranged under one another each with three adjacently arranged circles 300, 300'. The centre points of the adjacent circles 300, 300' have a distance from one another which is greater than the diameter of a circle 300, 300'. Each connecting line g through the centre points of adjacent circles 300, 300' extends in the present exemplary embodiment either along the longitudinal axis I-I or at right angles to this, i.e. along the transverse axis II-II. Each tile-shaped partial area 320, 320' is delimited by the circumferential groove-shaped recess 310, 310' which is obtained from an alternating arrangement of distance sections 302 and curve sections 304. In this case, the straight distance sections 302 of the circumferential groove-shaped recess 310 of a partial area 320 form a subsection of the circumferential groove-shaped recess 310' of the adjacent partial area 320'. Each of the curve sections 304 which delimit the tile-shaped partial area 320, also forms a subsection of the circular circumferential groove-shaped recess 300, 300' of the circular partial areas 322 adjoining the tile-shaped partial area 320.

Figure 5:
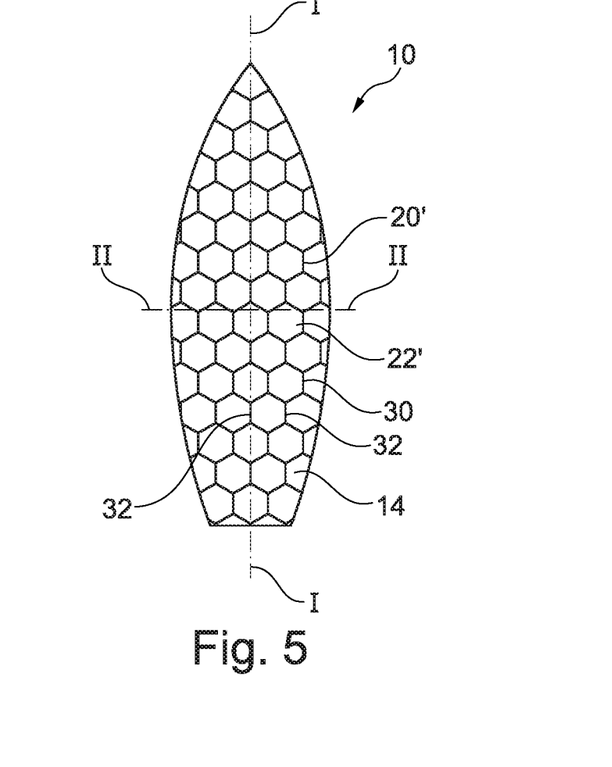
FIG. 5 shows a surfboard with circumferential groove-shaped recesses arranged in a honeycomb shape in plan view.

FIG. 5 shows the device 10 in the form of a surfboard which has circumferential groove-shaped recesses 20' extending over the entire surface 14, each of which has the form of a rectangular hexagon 30, a so-called honeycomb having substantially the same area content 22'. In this case, two mutually opposite distance sections 32 extend substantially parallel to a longitudinal axis I-I along which the surfboard 10 extends. Each distance section 32 forms a subsection of the circumferential groove-shaped recess 20' of adjacent partial areas 22'.

Figures 6, 7:
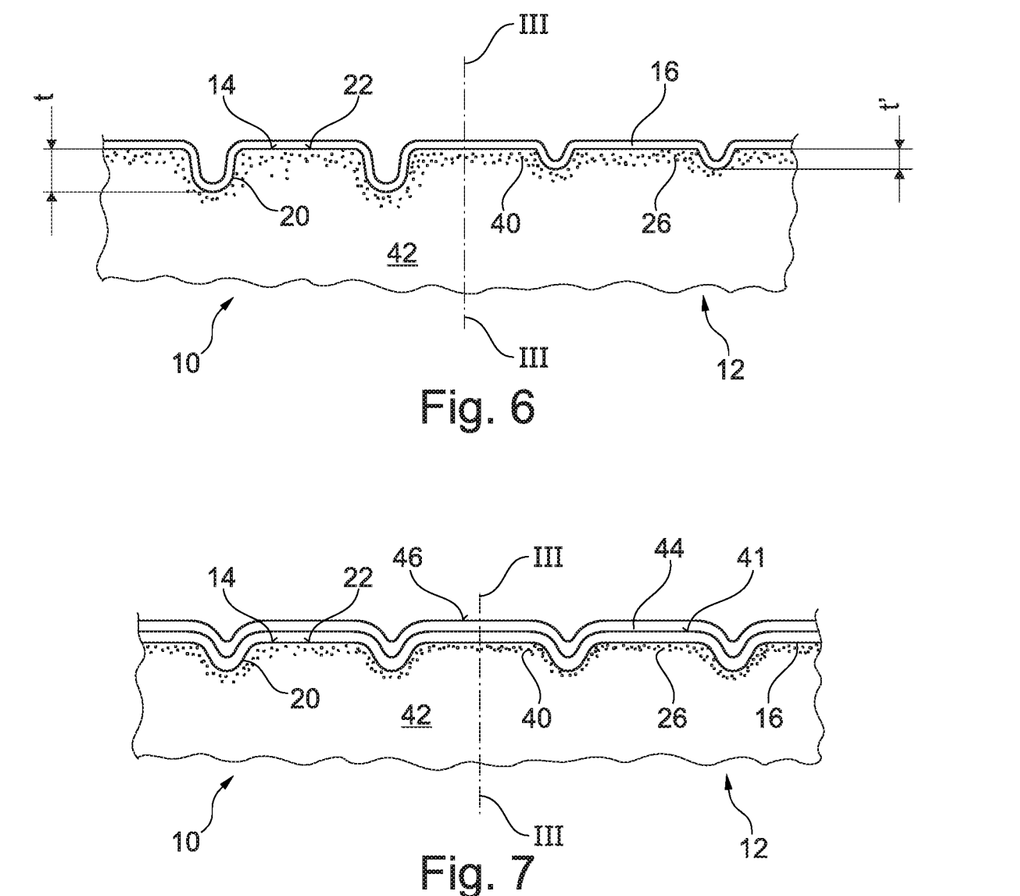
FIG. 6 shows a cross-section through a section of the device known from FIG. 1.
FIG. 7 shows a cross-section through a section of the device known in FIG. 1 with a second laminate layer in a first embodiment.

FIG. 6 shows a cross-section through a section of the device 10 known from FIG. 1 along a line of intersection A-A which can be seen in FIG. 1. The cross-section extends along a vertical axis III-III perpendicular to the longitudinal axis I-I and the transverse axis II-II. The surface 14 delimiting the body 12 has partial areas 22 which are delimited by circumferential groove-shaped recesses 20. The laminate layer 16 which is undetachably connected to the surface 14, extends along the surface 14. In the exemplary embodiment shown here, a depth t, t' which extends from the partial area 22 as far as a deepest point of the circumferential groove-shaped recess 20, varies. The different depths t, t' can be clearly seen in this exemplary embodiment. The depths can be approximately 0.5 mm to approximately 15 mm. In the present exemplary embodiment the greater depth t is 5 mm and the smaller depth t' is 3 mm. Not shown in this exemplary embodiment is a penetration of the foamed polystyrene from which the body 12 is made through the nonwoven made of glass fibers. From the laminate layer 16 the matrix 26 extends into the body 12 and forms an intermediate layer 40 between the surface 14 and a core 42 of the body 12. This intermediate layer 40 prevents an interface stress between the laminate layer 16 and the surface 14. On the contrary, a force acting on the laminate layer 16 is at least partially absorbed due to the intermediate layer 40 in which a fraction of the matrix 26 from the surface 14 as far as the core 42 is reduced to a predetermined extent and merely the remaining force is introduced into the core.

FIG. 7 shows a cross-section through a section of the device 10 known from FIG. 1 along the transverse axis II-II which can be seen in FIG. 1. Here also the cross-section extends along the vertical axis III-Ill. A second laminate layer 44 which is connected undetachably to the first laminate layer 16, extends on an upper side 41 of the first laminate layer 16. Thus, the second laminate layer 44 extends along the circumferential groove-shaped recesses 20 and maps the surface 14 with the circumferential groove-shaped recesses 20 on its upper side 46.

Figure 8:
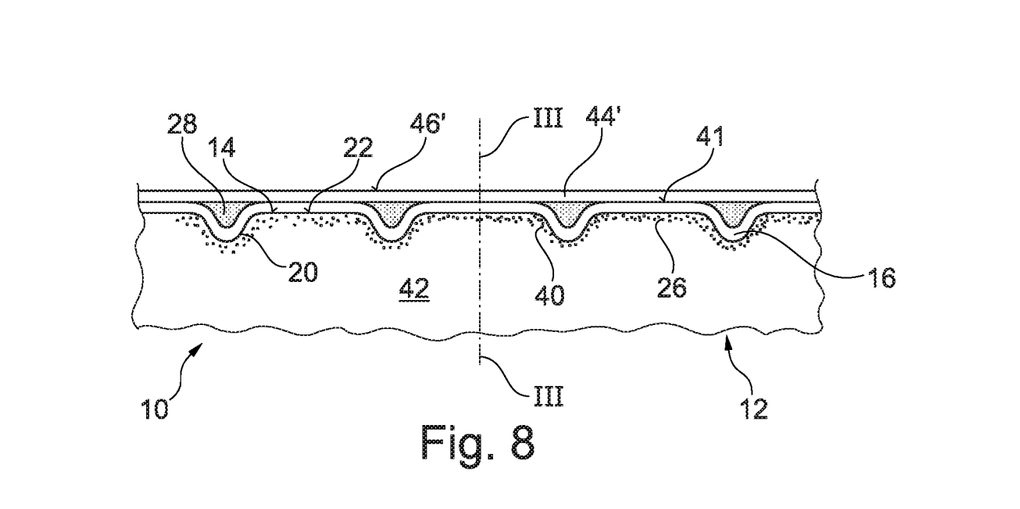
FIG. 8 shows a cross-section through a section of the device known in FIG. 1 with a second laminate layer in a second embodiment.

FIG. 8 shows a cross-section through a section of the device 10 known from FIG. 1 along the transverse axis II-II which can be seen in FIG. 1. Here also the cross-section extends along the vertical axis III-Ill. In contrast to the embodiment of FIG. 7, the circumferential groove-shaped recesses 20 mapped on the upper side 41 of the first laminate layer 16 are filled with a filled matrix 28. A filled matrix 28 is achieved by adding filler in the form of glass fiber scraps to the matrix in the present exemplary embodiment. A filled matrix 28 can also cure free from stresses in greater layer thicknesses and can be elastic as a result of the fillers. The recesses 20 mapped on the upper side 41 of the first laminate layer 16 are filled with so much matrix 28 that the recesses 20 are bridged and a second laminate layer 44' is undetachably connected to the first laminate layer 16 in the region of the partial areas 22 and to the filled matrix 28 in the region of the recesses 20. The second laminate layer 44' forms a substantially flat upper side 46'.

The surface can be enlarged by the circumferential groove-shaped recesses so that the laminate layer can rest on an enlarged area compared with a surface without recesses. More adhesion forces can act through the surface enlarged by the groove-shaped recess, which thus lead to an improved connection of the laminate layer to the foamed plastic of the body. Furthermore, the matrix can be adjusted by suitable measures in such a manner that it penetrates into the body, forms an intermediate layer there which improves the connection of the laminate layer to the body. The circumferential groove-shaped recesses delimit partial areas of the surface with an arbitrary contour. Due to the circumferential groove-shaped recesses, not only the surface can be increased to increase the connecting forces of the laminate layer to the body but also the bending stiffnesses around the longitudinal axis extending in the longitudinal direction of the device, the transverse axis and the vertical axis. Furthermore the bending stiffnesses about the longitudinal axis, the transverse axis and/or the vertical axis can be specifically adapted to the actually occurring loads by constant or varied depth of the circumferential groove-shaped recess and by the area content of the partial areas inscribed by the circumferential groove-shaped recess. Additional laminate layers can be applied to the first laminate layer to increase the bending stiffness.

Figure 9:
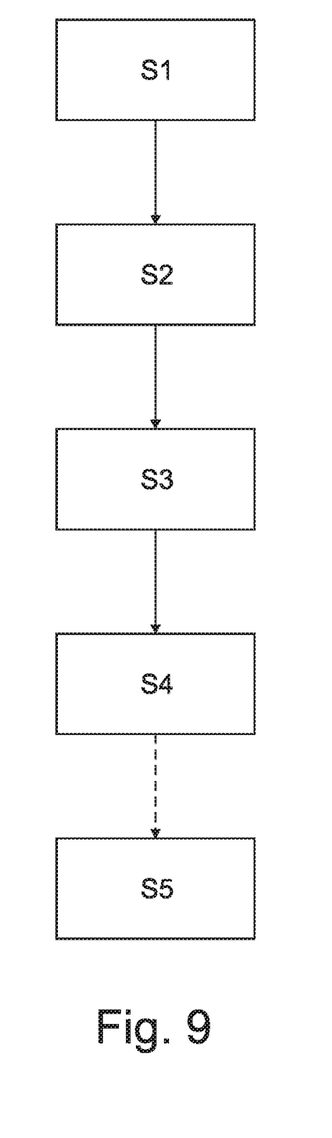
FIG. 9 shows a process sequence to produce the device.

FIG. 9 shows a process diagram for manufacturing a structural component with a reinforcement of a fiber-plastic composite, in particular a surfboard for stand-up paddling, wave riding, wind surfing and the like. Process step S1 comprises providing a substantially board-like body of foamed plastic which is delimited by a surface and completely encased with a fiber mat, in the present exemplary embodiment by a nonwoven of glassfibers. In a following process step S2 the circumferential groove-shaped recesses are applied in a subregion of the surface, wherein predetermined partial areas of the surface are delimited by the circumferential groove-shaped recesses. For this purpose there is a stamper which in the present exemplary embodiment has a size to execute all the circumferential groove-shaped recesses in one process step. Elevations are formed on the stamper, which correspond to the circumferential groove-shaped recesses to be applied. The stamper will be placed on the fiber mat at the predetermined point so that the elevations point towards the fiber mat. In a following process step S3 the stamper will be pressed by pneumatic cylinders with a predetermined force onto the fiber mat-body composite and the stamper will be heated to about 150° C. heating cartridges arranged in the stamper. By a lower temperature of the stamper, the penetration depth of the stamper into the body of the fiber mat-body composite can be reduced. Due to the temperature the plastic of the body melts and penetrates at least partially through the fiber mat. After application of the recesses, the stamper will be removed from the fiber mat-body composite. In a further process step S4 the fiber mat will be impregnated with matrix, covered with a tear-off fabric, placed in a vacuum bag and a predetermined negative pressure will be produced to make the matrix penetrate into the fiber mat. In this case, the matrix can penetrate through the fiber mat into the body and thus form an intermediate layer adjoining the surface of the body in which the volume fraction of the matrix decreases with increasing distance from the surface as far as a specific concentration. After reaching this concentration, the matrix usually does not penetrate more deeply into the body. After removing the structural component and removing the tear-off fabric, this process step is ended. In order to reinforce the structural component, in a further process step S5 one or more laminate layers can be applied to the first laminate layer. In this case, the recesses can be mapped in the following laminate layers or bridged. Also the at least one additional laminate layer can be applied to only a subregion onto one of the laminate layers in order to increase, for example, the impact resistance or the maximum permissible pressure loading in subregions. The optional nature of process step S5 is indicated by a dashed arrow.

The invention claimed is:

1. A fiber-reinforced board for a sport device, comprising:
a body made of plastic defining an outer surface;
at least one surface area of the outer surface defining a plurality of interconnected groove-shaped recesses that form perimeters of a plurality of adjacent bounded shapes wherein the plurality of interconnected groove-shaped recesses defines a plurality of paths and wherein in each case where a path formed by one or more of the plurality of grooves spans the at least one surface area, the path is nonlinear; and
a laminate layer comprised of a matrix and at least one fiber mat undetachably connected to and extending over the outer surface of the body, the fiber mat positioned within each of the plurality of groove-shaped recesses and held therein by the matrix.

2. The fiber-reinforced board according to claim 1, wherein each of the interconnected groove-shaped recesses forming one of the plurality of bounded shapes forms a side of an adjacent one of the plurality of bounded shapes.

3. The fiber-reinforced board according to claim 1, wherein a first subsection of a first one of the plurality of interconnected groove-shaped recesses of a first one of the plurality of bounded shapes forms a second subsection of a second one of the plurality of interconnected groove-shaped recesses of a second one of the plurality of bounded shapes.

4. The fiber-reinforced board according to claim 2, wherein each of the plurality of bounded shapes defines a surface area, wherein the surface area of one of the plurality of bounded shapes is of a different size than a surface area of another one of the plurality of bounded shapes.

5. The fiber-reinforced board according to claim 1, wherein a subregion of the outer surface comprises a plurality of partial areas delimited by the plurality of interconnected groove-shaped recesses which adjoin one another and in which respectively subsections of the plurality of groove-shaped recess of one partial area are formed by subsections of one groove-shaped recess of a neighboring partial area.

6. The fiber-reinforced board according to claim 1, wherein the plurality of interconnected groove-shaped recesses form a sequence of distance sections, curve sections or a combination thereof.

7. The fiber-reinforced board according to claim 1, wherein each of the plurality of bounded shapes have a contour of a hexagon which has at least four first sides of substantially the same length each opposite one another in pairs and two mutually opposite second sides of substantially the same length.

8. The fiber-reinforced board according to claim 1, wherein each of the plurality of bounded shapes is configured as a regular hexagon.

9. The fiber-reinforced board according to claim 1, wherein the plurality of groove-shaped interconnected recesses penetrate into the body by a depth measured from a surface of an adjacent bounded shape, wherein the depth is approximately 0.5 mm to approximately 15 mm.

10. The fiber-reinforced board according to claim 9, wherein the depth of each of the plurality of interconnected groove-shaped recesses is constant.

11. The fiber-reinforced board according to claim 9, wherein the depth of each of the plurality of interconnected groove-shaped recesses varies.

12. The fiber-reinforced board according to claim 9, wherein depths of two groove-shaped recesses of two adjacent bounded shapes are different.

13. The fiber-reinforced board according to claim 1, wherein the fiber mat lies completely against each of the plurality of groove-shaped recesses, and wherein a foamed plastic is passed at least partially through the fiber mat.

14. The fiber-reinforced board according to claim 1, wherein the body comprises a core and an intermediate layer over the core having a predefined thickness between the core and the outer surface of the body, and wherein the intermediate layer is filled with the matrix.

15. The fiber-reinforced board according to claim 1, further comprising a second laminate layer comprising a second fiber mat and a second matrix laminated to an upper side of the laminate layer extending over the outer surface of the body, wherein an underside of the second laminate layer extends along an upper side of the laminate layer.

16. The fiber-reinforced board according to claim 1, further comprising a second laminate layer comprising a second fiber mat and a second matrix laminated to an upper side of the laminate layer extending over the outer surface of the body, wherein an underside of the second laminate layer extends exclusively along the upper side of the laminate layer of the plurality of bounded shapes so that an upper side of the second laminate layer is flat.

17. The fiber-reinforced board of claim 1, wherein the fiber-reinforce structural component is shaped in the form of a surfboard for stand-up paddling, wave riding or wind surfing, and wherein the body is configured to float on water.

18. The fiber-reinforced board of claim 1, wherein material of the body is present in the at least one fiber mat.

19. The fiber-reinforced board according to claim 1, wherein fibers of the at least one fiber mat are present in the body.

* * * * *